United States Patent [19]

Chatterji et al.

[11] 4,048,390

[45] Sept. 13, 1977

[54] NA/S CELL REACTANT CONTAINER WITH METAL ALUMINIDE COATING

[75] Inventors: Debajyoti Chatterji, Latham; Robert R. Dubin, Charlton, both of N.Y.

[73] Assignee: Electric Power Research Institute, Inc., Palo Alto, Calif.

[21] Appl. No.: 752,369

[22] Filed: Dec. 20, 1976

[51] Int. Cl.$^2$ .............................................. H01M 4/36
[52] U.S. Cl. .................................................... 429/102
[58] Field of Search ................................ 429/102–104

[56] References Cited

U.S. PATENT DOCUMENTS 3,644,145  2/1972  Fraioli ................................... 429/102
3,982,957  9/1976  Jones et al. ........................ 429/104 X Primary Examiner—C. F. Lefevour
Attorney, Agent, or Firm—Townsend and Townsend

[57] ABSTRACT

Electrically conducting components of sodium/sulfur batteries subject to the corrosive attack of the cell reactants are protected by aluminiding to provide a conductive, protective coating of a metal aluminide. The protective coating finds particular application in the metal conducting container forming the sulfur compartment, where the metal aluminide reacts with the sulfur and sodium polysulfide to form a protective, doped, aluminum sulfide coating, which is conductive due to the presence of the metal from the container.

1 Claim, No Drawings

NA/S CELL REACTANT CONTAINER WITH METAL ALUMINIDE COATING

This invention was made under contract with or supported by the Electric Power Research Institute.

BACKGROUND OF THE INVENTION

1. Field of the Invention

The sulfur reactant container in sodium/sulfur cells is subject to attack in contact with molten sodium polysulifde and sulfur reactants. Aluminum has been identified as a nondegrading material in this environment, because it forms a continuous layer of aluminum sulfide over its exposed surfaces. Although this layer is protective, it is electrically insulating and prevents the use of untreated aluminum as an electrode material in sodium/sulfur cells.

Other metals, such as nickel, iron and their alloys, are inadequate as electrode and container materials in their untreated form. They form porous metal sulfide scales which lead to extensive physical degradation and contamination of the catholyte melt under cycling. This interferes with efficient cell operation and causes discharge capacity losses, cell resistance increases and degradation of the electrolyte.

A preferred sulfur reactant container or other electrically conducting component subject to corrosive attack by the battery reactant would be a low cost material or composite material, which exhibits the chemical stability of aluminum and the strength and electrical properties of iron or nickel or their alloys. It would therefore be desirable to convert an iron or nickel based container or component surface, such that on exposure to the cell reactants, particularly the sulfur-sodium polysulfide melt, a doped, electrically conductive aluminum sulfide scale will form, instead of the pure electrically insulating aluminum sulfide scale found on pure aluminum under the same environment.

2. Description of the Prior Art

Smialek, "Exploratory Study of Oxidation-Resistant Aluminized Slurry Coatings for IN-100 and WI-52 Superalloys" NASA'TN'D'6321 (1971), and Llewelyn, "Protection of Nickel-Base Alloys Against Sulfur Corrosion by Pack Aluminizing," *Hot Corrosion Problems Associated with Gas Turbines*, ASTM-STP-21 (September 1967) Grisaffe, S.J., "Coatings and Protections", Chapter 12, *The Superalloys* Edited by C. T. Sims and W. C. Hagel, John Wiley & Sons, N.Y. 1972 all teach the preparation of metal aluminide coatings and their application as protective coatings for superalloys in high temperature turbines.

SUMMARY OF THE INVENTION

An electrically conductive mechanically strong material is provided, particularly for use in sodium/sulfur batteries in contact with the cell reactants, by aluminiding a metal sheet or component composed of iron, nickel, or their alloys to form a coat of metal aluminide, and treating the metal aluminide surface with sulfur and/or sulfide to form a protective electrically conducting surface of aluminum sulfide.

DESCRIPTION OF THE SPECIFIC EMBODIMENTS

Sodium/sulfur batteries have three basic components: sodium, sulfur and a solid $\beta$-alumina electrolyte. The battery is run at elevated temperatures, frequently 300° C or higher, which in conjunction with the high chemical reactivity of the cell reactants creates serious materials problems. There is the further consideration, that sulfur is nonconductive. Therefore, means must be provided for introducing and removing electricity from the sulfur in the sulfur reactant cell. Conveniently, a metal container may be employed for the sulfur cell which is electrically conducting and graphite or carbon fibers distributed through the sulfur. Means are then provided for electrical connection between the container and the carbon fibers.

Conventional structural metals are susceptable to corrosive attack by sulfur and sodium. In accordance with this invention, structural metals such as iron, nickel and their alloys, particularly with cobalt, are aluminided on the surface subject to corrosive attack.

The metal component, which can be unshaped or shaped, can be coated with the metal aluminide by a variety of conventional processes. Such chemical or physical processes known in the art include pack aluminiding, plasma spraying, hot dipping, metalliding, vacuum deposition, sputtering, and the like. Where necessary, the coated product may be heated to a temperature of about 900° C for a time sufficient to cause reaction between the aluminum coating and the base metal or alloy. The temperatures and times will vary widely, depending upon the base alloy.

The coating will generally be at least about 50 angstroms thick and may be up to one mil or greater. The metal aluminide is then subjected to molten sulfur or sulfides for a sufficient time to form a coating of aluminum sulfide. This can occur in the sodium-sulfur cell itself.

In order to exemplify the subject invention, pack aluminiding was carried out. Alloy samples (53.7%Fe-29%Ni-17%Co-0.3%Mn:% by weight) were aluminided by the pack processing technique. The process involved aluminiding for three hours at 1060° C employing argon using an Inconel retort. The composition of the pack was 1% aluminum, 0.25% ammonium floride and the balance aluminum oxide (percents by weight). After processing, the sample cross sections revealed formation of a uniform metal aluminide skin on the sample surface. The degree of aluminiding to form this skin can be varied by controlling the aluminum activity in the pack, the process temperature, and the aluminiding time. The surface was then exposed to molten sodium polysulfide at a temperature of about 300° C. The resulting aluminum sulfide surface was found to be electrically conductive and inert to sulfur.

Samples prepared by the above method were cycled in molten sodium polysulfide for up to 775 hours at 30 $ma/cm^2$ and showed no serious signs of chemical attack. No evidence of flaking or scale formation was apparent. The sample was cross sectioned after cycling and revealed no signs of subsurface corrosion, indicating that the metal aluminide surface skin prevented base metal attack. In contrast, identical metal substrates which were not protected showed extensive surface reaction and degradation. No unusually large polarizations were noted during cycling. This is accepted as evidence that the protective scale formed is an electrically conductive doped aluminum sulfide. The electrical conductivity of the coating was considered adequate for use in sodium/sulfur cells.

In order to further test the subject invention a cathode container employing a metal aluminide coating was cycled in a sodium-sulfur cell. The composition of the container material was the previously described alloy and the protective metal aluminide coating was applied by the previously described pack processing technique. Cell resistance was 0.20 - 0.25 ohms and available cell cycling capacity was about 9 Ahrs. The long term (more than 3,000 hrs.) cell cycling performance at 1 Amp and 2 Amp constant current rates was improved compared to performance of similar cells made without metal aluminide coatings.

The subject protective coating need not be limited to environments where sulfur or polysulfide is present. The protective coating may also be used for protecting a surface from molten sodium.

The protective coating may be applied to a wide variety of components concerned with sodium/sulfur batteries. Besides the container, header materials, electrode materials, electrical contacts and feed throughs may also find protective coatings advantageous.

The subject invention provides a simple and convenient way for employing structural metal materials while protecting the materials from corrosive attack by sodium and sulfur at the high temperatures employed in sodium/sulfur batteries. Particularly, the subject invention provides a satisfactorily conducting inert coating to allow for removal of electricity from sulfur and sodium cells, as well as the introduction of electricity, without degradation or contamination of the cell reactants.

Although the foregoing invention has been described in some detail by way of illustration and example for purposes of clarity of understanding, it will be obvious that certain changes and modifications may be practiced within the scope of the appended claims.

We claim:

1. In a sodium-sulfur battery the improvement which comprises:
   electrically conducting components of said battery comprised of a metal or an alloy having a major amount of a metal selected from the group consisting of iron, cobalt and nickel, having an aluminide coating on surfaces in contact with sulfur.

* * * * *